(12) United States Patent
Isoda

(10) Patent No.: US 8,819,547 B2
(45) Date of Patent: Aug. 26, 2014

(54) IMAGE PROCESSING APPARATUS AND IMAGE PROCESSING METHOD

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 12/498,868

(22) Filed: Jul. 7, 2009

(65) Prior Publication Data
US 2010/0011286 A1    Jan. 14, 2010

(30) Foreign Application Priority Data
Jul. 11, 2008    (JP) ................................. 2008-181413

(51) Int. Cl.
*G06F 17/00*    (2006.01)
*G06T 11/00*    (2006.01)

(52) U.S. Cl.
CPC ....................................... *G06T 11/00* (2013.01)
USPC .......... 715/255; 715/233; 715/246; 358/3.28; 713/176

(58) Field of Classification Search
CPC ... G06F 17/241; G06F 17/212; G06F 17/211; G06F 17/24; H04L 9/3278; H04N 1/32144
USPC ................. 715/794, 766, 233, 243, 246, 255; 713/176; 358/3.28
See application file for complete search history.

(56) References Cited

U.S. PATENT DOCUMENTS

| | | | | |
|---|---|---|---|---|
| 6,025,841 | A * | 2/2000 | Finkelstein et al. | 715/803 |
| 7,277,095 | B2 * | 10/2007 | Beaumont | 345/421 |
| 7,280,123 | B2 * | 10/2007 | Bentley et al. | 345/629 |
| 7,610,561 | B2 * | 10/2009 | Blaukopf et al. | 715/794 |
| 7,831,908 | B2 * | 11/2010 | Danilo | 715/245 |
| 2004/0139384 | A1 * | 7/2004 | Lin | 715/500 |
| 2005/0206158 | A1 * | 9/2005 | Noyama et al. | 283/74 |
| 2006/0271871 | A1 * | 11/2006 | Blaukopf et al. | 715/764 |
| 2007/0288393 | A1 * | 12/2007 | Boyer et al. | 705/76 |
| 2009/0150815 | A1 * | 6/2009 | Thornborrow | 715/766 |

FOREIGN PATENT DOCUMENTS

| | | |
|---|---|---|
| JP | 2006-180262 A | 7/2006 |
| JP | 2007-36316 | 2/2007 |
| JP | 2007036316 A   * | 2/2007 |

OTHER PUBLICATIONS

Adobe Acrobat 8, Sep. 2006, Adobe Systems Inc.*
Microsoft Word 2007, Dec. 2006, Microsoft Inc.*
John Deubert, Adobe Acrobat 8 for Windows and Macintosh: Visual Quickstart Guide, Dec. 2006.*
Herb Tyson, Microsoft Words 2007 Bible, Mar. 2007.*
Microsoft Word 2007, released Dec. 2006, Microsoft Inc., screenshots taken by Examiner.*
Official Action, dated Apr. 27, 2012, issued by the Japanese Patent Office, in Japanese Patent Application No. 2008-181413.

* cited by examiner

*Primary Examiner* — Adam M Queler
*Assistant Examiner* — Howard Cortes
(74) *Attorney, Agent, or Firm* — Filpatrick, Cella, Harper & Scinto

(57) ABSTRACT

Upon adding a visible electronic signature to an electronic file, deterioration in visibility of characters is prevented by arranging a character image data of a portion overlapping with a region of the visible electronic signature in an upper position layer above the visible electronic signature. There are included a step for extracting a character image data from an image data, a step for generating a character image layer data in which only the character image data is described on a transparent background if a region where the visible electronic signature is arranged and the region of the character image data overlap with each other, and a step for generating an electronic file with a layered structure having the character image layer data, the visible electronic signature and the image data in that order from an upper position of the layered structure.

17 Claims, 12 Drawing Sheets

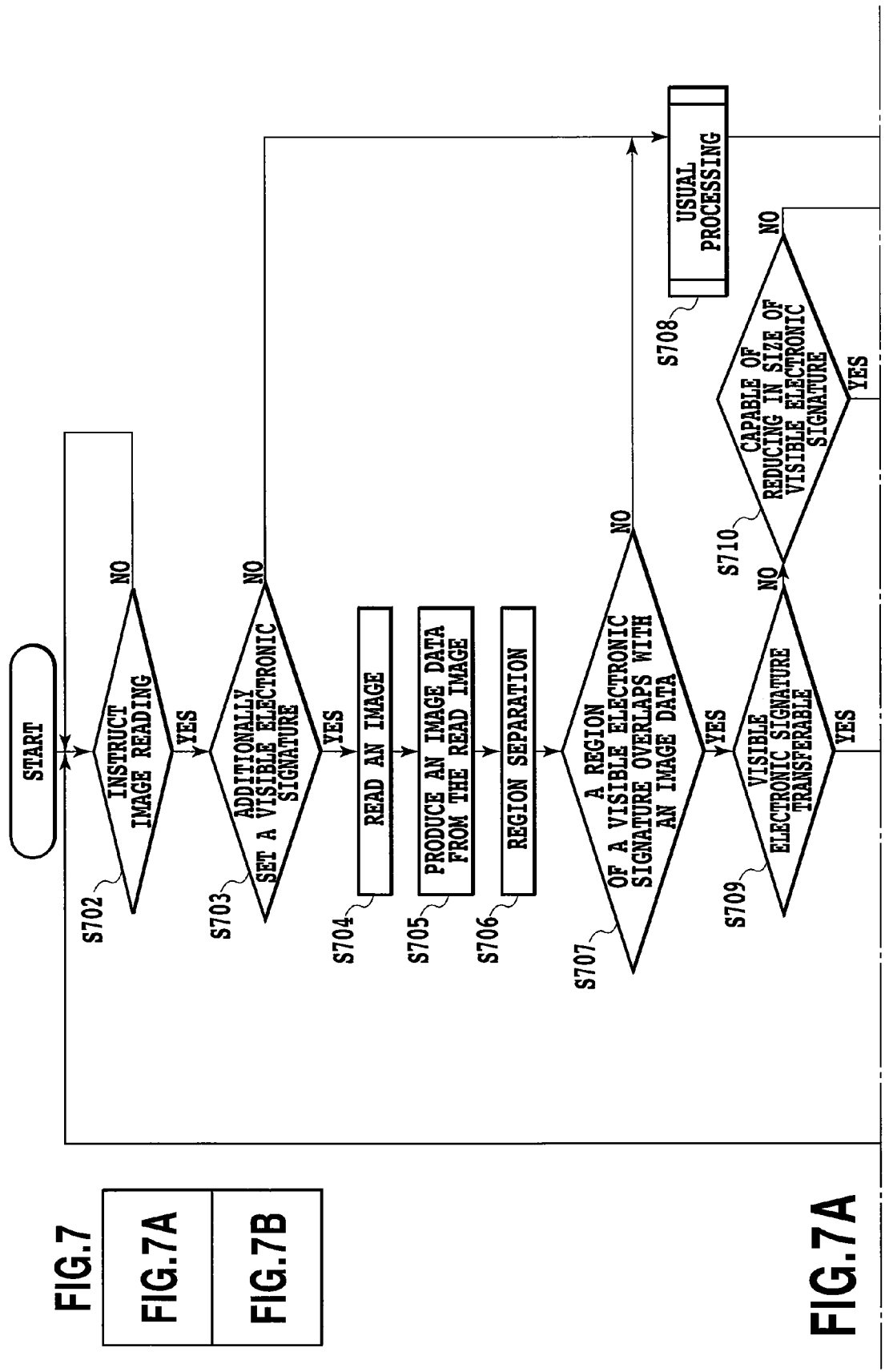

IMAGE PROCESSING APPARATUS AND IMAGE PROCESSING METHOD

BACKGROUND OF THE INVENTION

1. Field of the Invention

The present invention relates to an image processing apparatus and an image processing method, and particularly, to an image processing apparatus and an image processing method which add a visible electronic signature to an electronic file generated from a read image.

2. Description of Related Art

In recent years, the importance of detecting whether or not an electronic file received from a producer of the electronic file is altered dishonestly has been increasing. An electronic signature can be used as a method of detecting such a dishonest alternation. The electronic signature is a method in which a hash value of an electronic file is calculated, the hash value is encrypted by a secret key which is produced by an open key cipher system, and the encrypted hash value is accessible only by the producer and is provided as an electronic signature to the electronic file. A receiver of the electronic file decrypts the encrypted hash value with an open key opened by the producer. When the decrypted hash value and the hash value calculated from the electronic file are compared, if both of the values are the same with each other, it is possible to determine that after the producer appended the electronic signature, the electronic file has not been altered dishonestly. On the other hand, if the values are different from each other, it is possible to determine that after the producer appended the electronic signature, the electronic file was altered dishonestly.

This electronic signature includes an invisible electronic signature which is not displayed and a visible electronic signature which is displayed on a display, when the electronic file is viewed by a viewer of the electronic file. The visible electronic signature has an advantage that the electronic signature can be viewed visually and in contrast, a disadvantage that image information in a region corresponding to the region of the electronic signature is hidden.

On the other hand, use of an application for a personal computer capable of providing the visible electronic signature to the electronic file enables a producer of the electronic file to determine a position of the visible electronic signature while confirming an image with the application. Therefore, the producer enables an important region (for example, character region) in an image data where effective information (for example, characters) exists not to be hidden by the visible electronic signature. However, in a reader for producing an electronic file by reading a paper by a scanner, it is required to in advance set a position of a visible electronic signature before reading the paper because of the use form. In consequence, the important region (for example, character region) in the image data may be possibly hidden by the visible electronic signature. For avoiding this problem, there is a method disclosed in Japanese Patent Laid-Open No. 2007-036316, for example. This method specifies a region in image data where a visible electronic signature is arranged to determine whether or not effective information exists in the region. Next, in a case where the effective information exists in the region, a change in the arrangement of the visible electronic signature, a reduction in size of the visible electronic signature, processing the visible electronic signature to be translucent or the like is performed (Japanese Patent Laid-Open No. 2007-036316).

However, a method of changing the arrangement of the visible electronic signature, a method of reducing a size of the visible electronic signature or a method of processing the visible electronic signature to be translucent has the following problems.

In a case of the method of changing the arrangement of the visible electronic signature, the method is effective when a region in which the effective information does not exist and which is larger than the visible electronic signature exists in an image data. However, such a region does not necessarily exist in all the image data.

In a case of the method of reducing the size of the visible electronic signature, it can not be safely determined that the effective information does not exist in a region of the reduced visible electronic signature.

In a case of the method of processing the visible electronic signature to be translucent, how much translucent the visible electronic signature should be made depends on image data of a portion where the regions overlap and individual parameters of each information contained in the regions (image information, character information, a combination of the colors, and importance degree of each information). Therefore, it is difficult to automatically determine the most appropriate transparency degree. Most of the important information is generally expressed in characters. Therefore, even if the visible electronic signature is processed to be translucent, since visibility of all or a part of characters contained in a region overlapping with a region of the visible electronic signature remarkably deteriorates, it is difficult for a receiver of the electronic file to perform visual check of characters, leading to the possibility that the important information can not be transmitted to the receiver.

SUMMARY OF THE INVENTION

Therefore, an object of the present invention is to prevent deterioration in visibility of characters by arranging a character image data of a portion overlapping with a region of a visible electronic signature in an upper position layer upon adding the visible electronic signature to an electronic file.

An image processing apparatus in the present invention is an image processing apparatus which adds a visible electronic signature, comprising a character image extraction unit for extracting a character image data from an image data; a determination unit for determining whether or not a region where the visible electronic signature is arranged and a region of the character image data overlap with each other; a character image layer generating unit for generating a character image layer data in which the character image data is described on a transparent background in a case where the determination unit determines that the region where the visible electronic signature is arranged and the region of the character image data overlap with each other; and a file generating unit for generating an electronic file with a layered structure having the character image layer data, the visible electronic signature and the image data in that order from an upper position of the layered structure.

An image processing apparatus in the present invention is an image processing apparatus which adds a visible electronic signature, comprising a region separate unit for extracting a image region from an image data; a determination unit for determining whether or not a region where the visible electronic signature is arranged and the extracted image region overlap with each other; a translucence unit for processing the visible electronic signature to be translucent in a case where the determination unit determines that the region where the visible electronic signature is arranged and the extracted image region overlap with each other; and a file generating unit for generating an electronic file having the image data to which the translucent processed visible electronic signature is added.

An image processing device in the present invention is an image processing device which adds a visible electronic signature, comprising a region separate unit for extracting a character region and an image region from an image data; a selection unit for selecting at least one of translucency processing of the visible electronic signature and generation of a character image layer data in which the character image data of the character region is described on a transparent background according to a preset priority in a case where both of the image region and the character region overlap with the region where the visible electronic signature is arranged; a translucence unit for processing the visible electronic signature to be translucent in a case where the selection unit selects translucency processing of the visible electronic signature; a character image layer generating unit for generating a character image layer data in which the character image data is described on a transparent background in a case where the selection unit selects generation of a character image layer data; and a file generation unit for generating an electronic file having the image data to which the translucent processed visible electronic signature is added in a case where the selection unit selects the translucency processing of the visible electronic signature and otherwise for generating an electronic file with a layered structure having the character image layer data, the visible electronic signature, and the image data from the upper position of the layered structure in a case where the selection unit selects the generation of the character image layer data.

Further features of the present invention will become apparent from the following description of exemplary embodiments with reference to the attached drawings.

BRIEF DESCRIPTION OF THE DRAWINGS

FIG. 7 is a flow chart showing the relationship of FIGS. 7A and 7B;

FIG. 7A is a flow chart showing a flow of control in the image processing device according to the second embodiment;

DESCRIPTION OF THE EMBODIMENTS

First Embodiment

Figure 1:
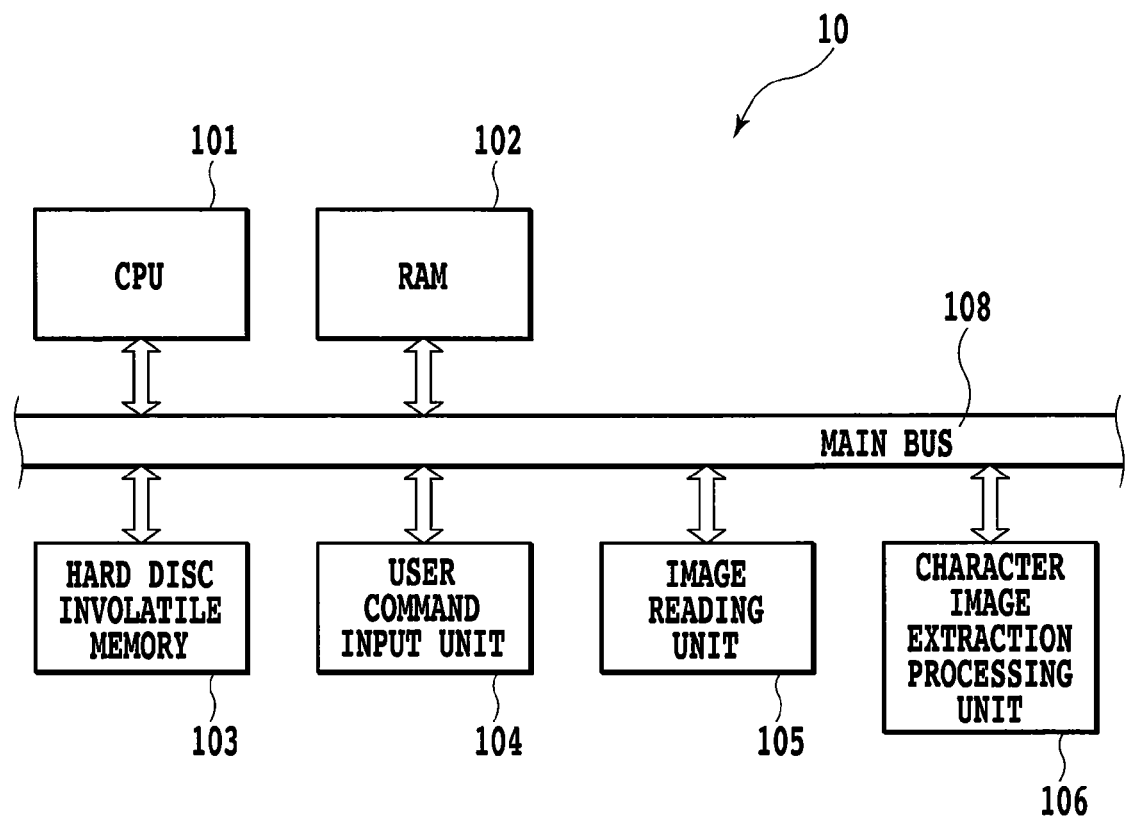
FIG. 1 is a block diagram showing an arrangement example of an image processing device according to a first embodiment.

FIG. 1 is a block diagram showing an arrangement example of an image processing device according to a first embodiment.

An image processing device 10 is provided with a CPU 101, a RAM 102, a hard disc 103, a user command input unit 104, an image reading unit 105, a character image extraction processing unit 106, and a main bus 108. The hard disc 103 stores programs, files and so on. The user command input unit 104 inputs various types of settings by a user. The character image extraction processing unit 106 extracts a character image data from the read image. The CPU 101 controls the RAM 102, the hard disc 103, the user command input unit 104, the image reading unit 105 and the character image extraction processing unit 106 according to the program. The CPU 101 is included in a control unit (not shown) for comprehensively controlling the whole image processing device.

Figure 2:
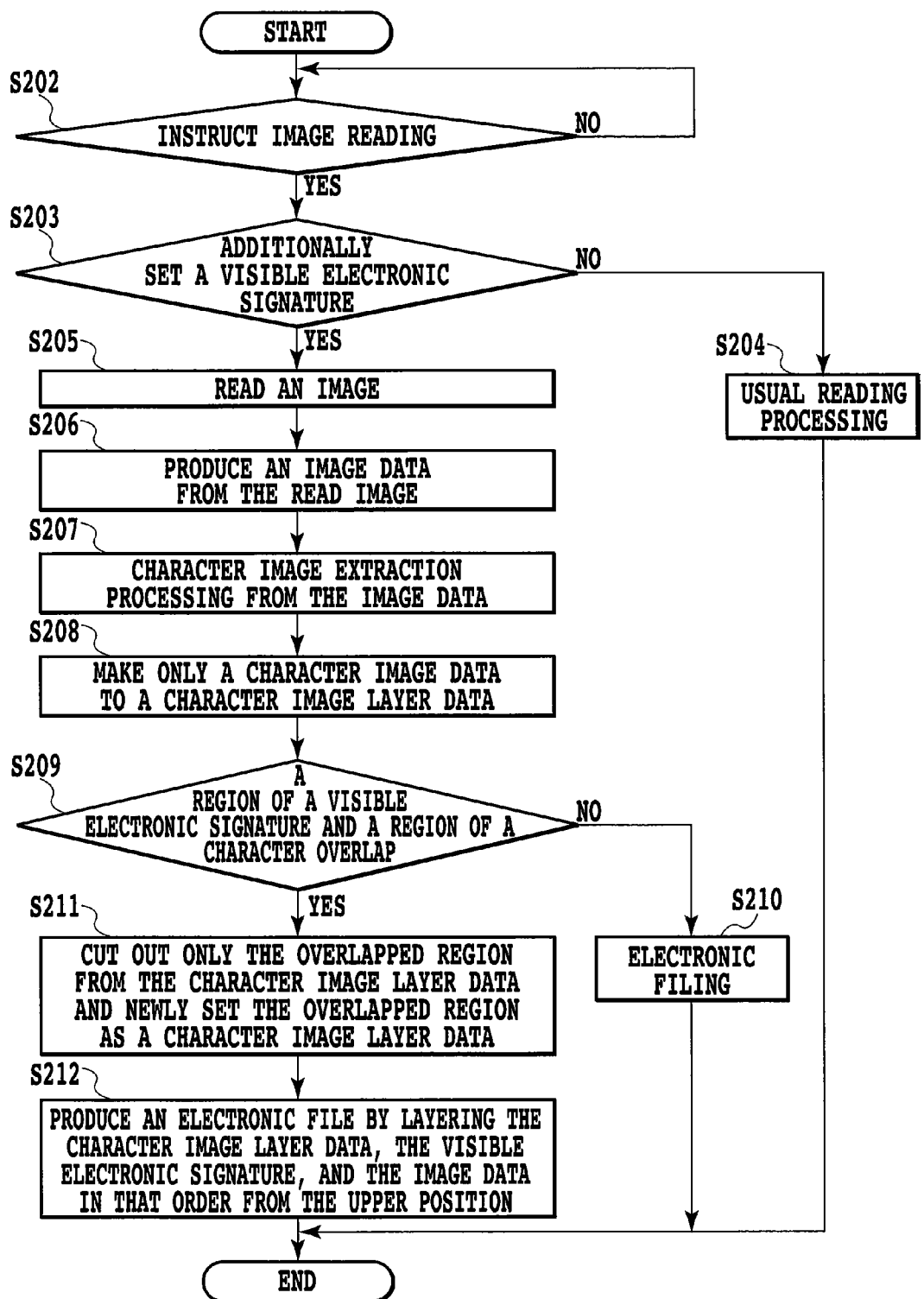
FIG. 2 is a flow chart showing a flow of control in the image processing device according to the first embodiment.

FIG. 2 is a flow chart showing a flow of control in the image processing device according to the first embodiment.

At S202, the control unit waits for an image reading instruction which is input to the control unit from the user command input unit 104.

When the image reading instruction is input, at S203 the control unit determines whether or not the setting of adding a visible electronic signature to an electronic file to be produced is made. Whether to add the visible electronic signature or not is in advance set through the user command input unit 104 by a user. In a case where the setting of adding the visible electronic signature is not made, the control unit goes to the process at S204, wherein usual image reading processing is performed and an electronic file is produced from the read image data. On the other hand, in a case where the setting of adding the visible electronic signature is made, the control unit goes to the process at S205, wherein image reading processing is performed.

At S206, the control unit generates an image data from the read image.

At S207, the control unit extracts only a character image data from the image data using the character image extraction processing unit 106. The character image extraction processing can utilize a known method. The character image data obtained from the character image extraction processing is made as a bit map data. In the present embodiment, the character image data obtained from the character image extraction processing is made as the bit map data, but may be a character image data expressing a contour of a character by a vector.

At S208, the control unit uses the character Image data obtained in the character image extraction processing unit 106 to produce a character image layer data in which only the character image data is described on a transparent background. At this time, a character image data of a header/footer of a page number or the like provided by the image processing device or a header/footer provided to an image from the beginning may be deleted from the character image layer data to be produced.

At S209, the control unit determines whether or not an arrangement region of the visible electronic signature in advance specified by a user and a character region on the character image layer data overlap with each other.

In a case where the arrangement region of the visible electronic signature and the character region on the character image layer data do not overlap, at S210 the control unit adds the visible electronic signature to the image data and produces an electronic file of the image data to which the visible electronic signature is added, and the process ends. On the other hand, in a case where the arrangement region of the visible electronic signature and the character region on the character image layer data overlap, at S211 the control unit cuts out a character contained in a region overlapping with the arrangement region of the visible electronic signature from the character image layer data obtained at S208 and newly sets the cut-out character as a character image layer data.

At S212, the control unit produces an electronic file with a layered structure having the character image layer data generated at S211, the visible electronic signature and the image data in that order from an upper position of the layered structure.

Figure 3:
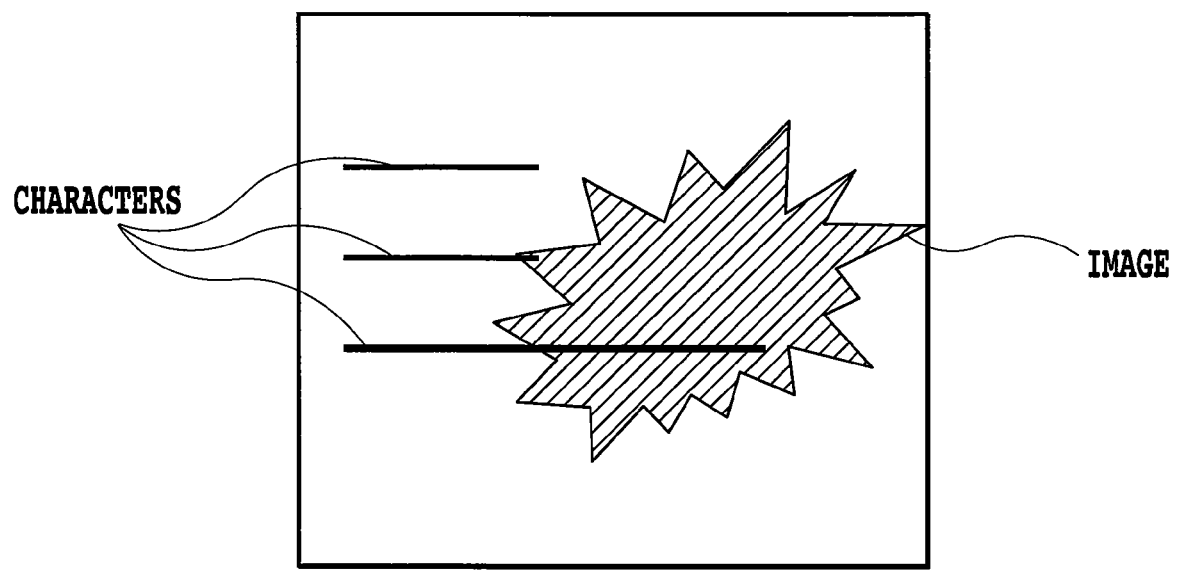
FIG. 3 is a diagram showing an example of image data.
Figure 4:
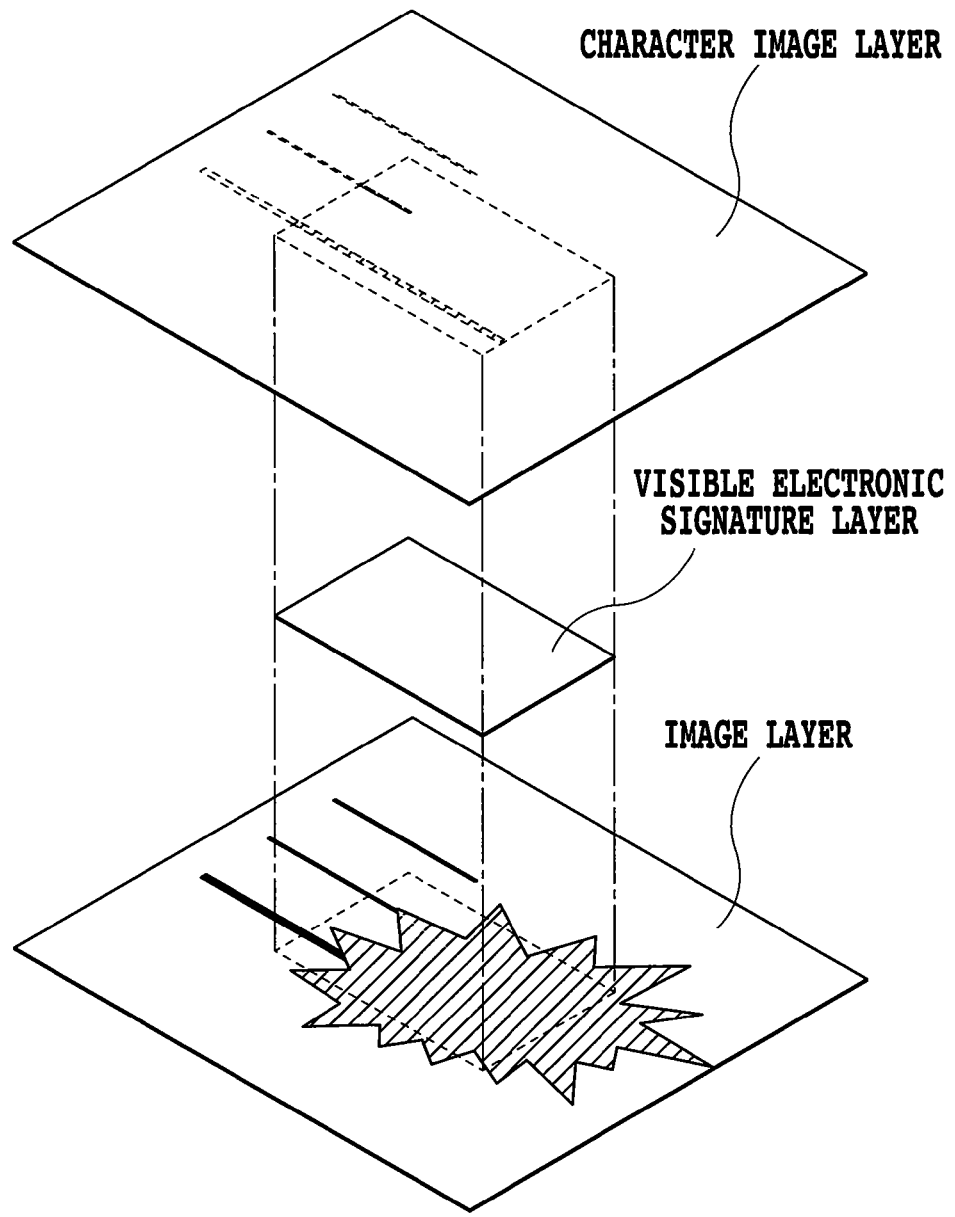
FIG. 4 is a diagram showing a layered structure.
Figure 5:
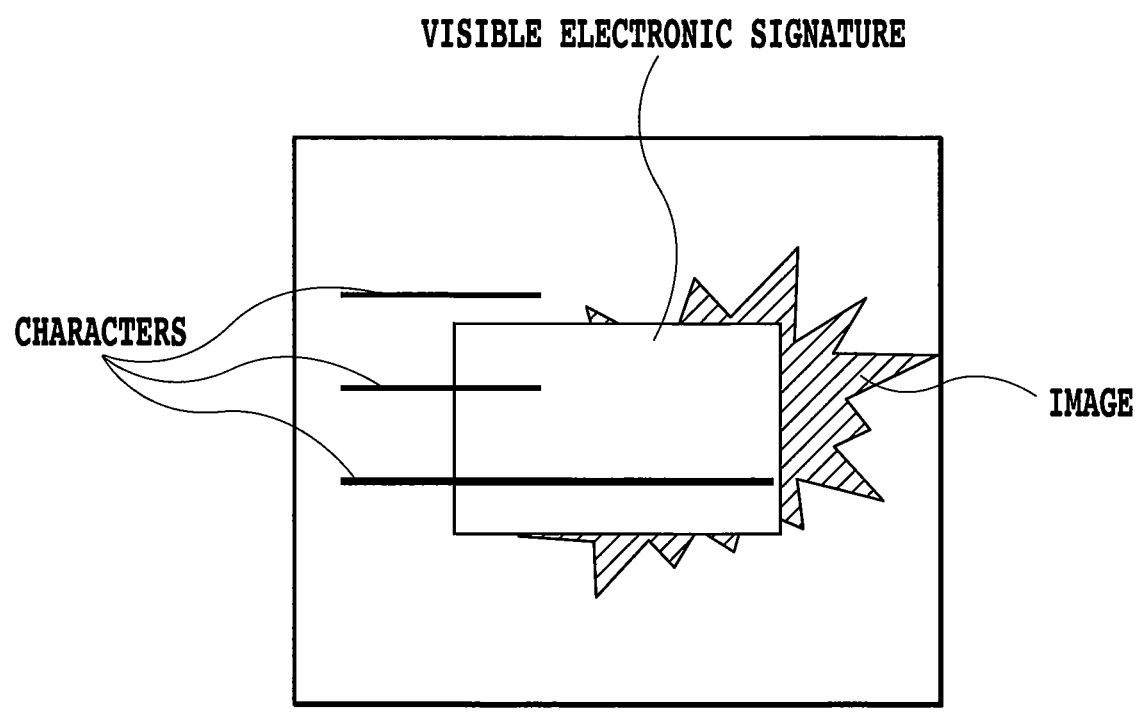
FIG. 5 is a diagram showing a screen example at the time of viewing an electronic file with a viewer application.

FIG. 3 is a diagram showing an example of the image data before adding the visible electronic signature thereto. This image data is constructed of characters and an image, wherein the example of FIG. 3 simplifies the character strings as black lines for an explanation. FIG. 4 is a diagram showing the layered structure obtained by the process at S212 shown in FIG. 2. The layered structure is constructed of the character image layer, the visible electronic signature layer and the image layer in that order from the upper position of the layered structure. FIG. 5 is a diagram showing a screen example at the time of viewing the electronic file produced by the process at S212 with a viewer application. As seen from FIG. 5, since the character of the portion overlapping with the region of the visible electronic signature is arranged in the upper layer from the visible electronic signature, degradation in visibility of the character due to the overlapping of the visible electronic signature does not occur. In many events, the character image portion usually shows important information, but, according to the present invention, there does not occur an event that the character portion as the important information is hidden by the visible electronic signature.

Second Embodiment

Figure 6:
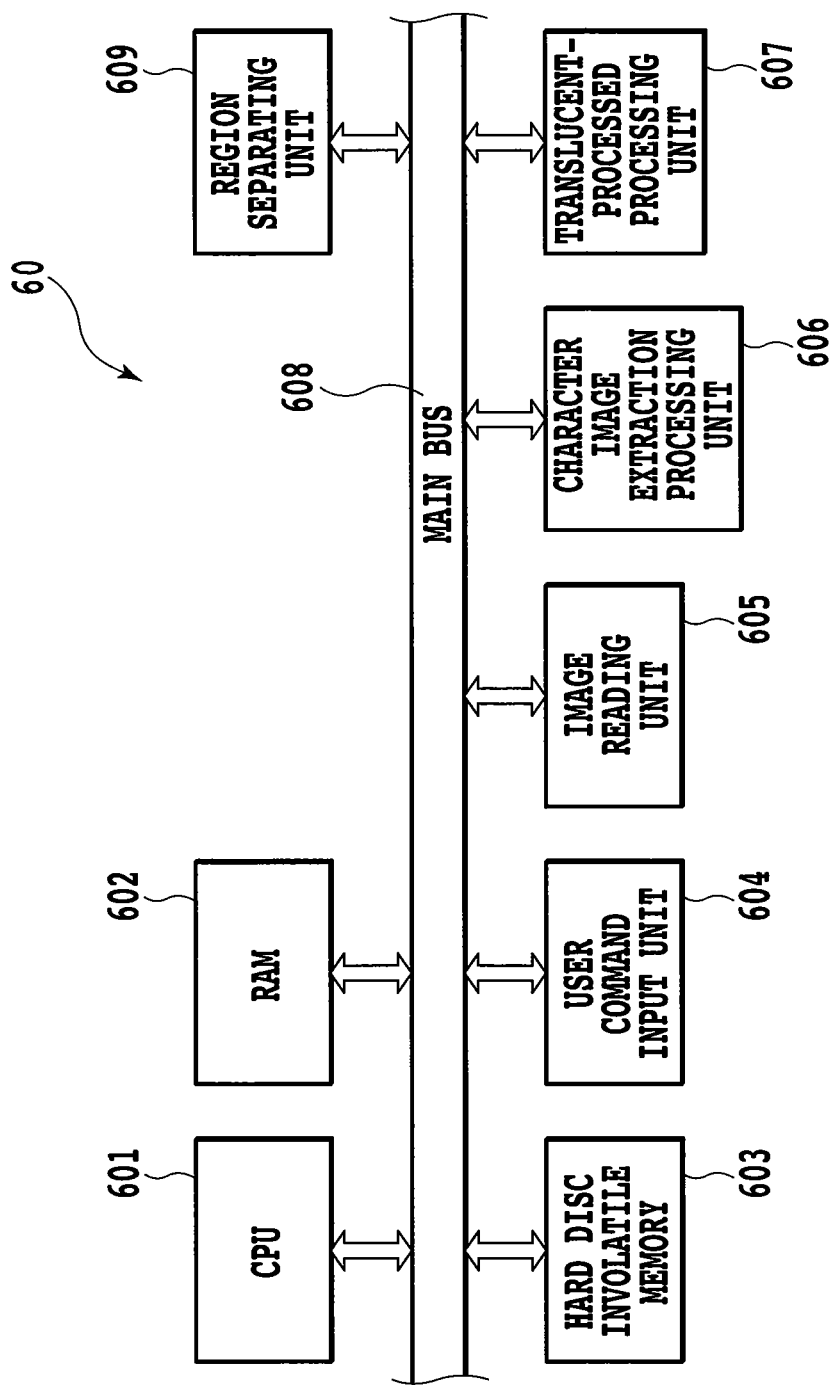
FIG. 6 is a block diagram showing an arrangement example of an image processing device according to a second embodiment.

FIG. 6 is a block diagram showing an arrangement example of an image processing device according to a second embodiment.

An image processing device 60 is provided with a CPU 601, a RAM 602, a hard disc 603, a user command input unit 604, an image reading unit 605, a character image extraction processing unit 606, a translucent-processed processing unit 607, a main bus 608, and a region separating unit 609. The hard disc 603 stores programs, files and so on. The user command input unit 604 inputs various types of settings by a user. The character image extraction processing unit 606 extracts a character image data from the read image. The translucent-processed processing unit 607 performs processing of making an image translucent. The region separating unit 609 separates an image region (a region of a picture or an illustration) and a character region from the image data. The CPU 601 controls the RAM 602, the hard disc 603, the user command input unit 604, the image reading unit 605, the character image extraction processing unit 606, the translucent-processed processing unit 607, and the region separating unit 609 according to the program. The CPU 601 is included in a control unit (not shown) for comprehensively controlling the whole image processing device.

Figure 8:
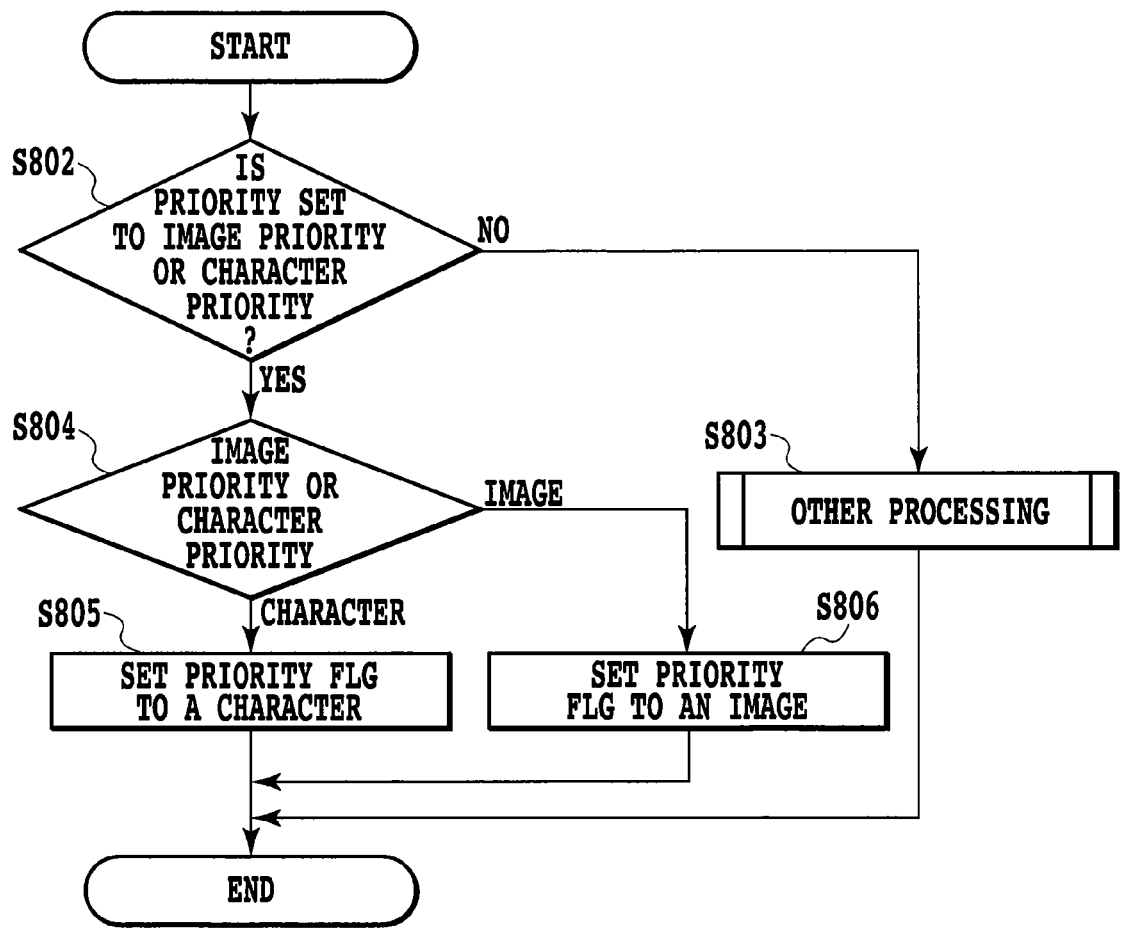
FIG. 8 is a flow chart showing a flow of a selection method on whether to select image priority or character priority when a region of a visible electronic signature and both of regions of a character and an image overlap with each other.

FIG. 8 is a flow chart showing a flow of a selection method on whether to select image priority or character priority when a region of a visible electronic signature and both of regions of a character and an image overlap with each other.

At S802, the control unit determines whether a priority set at the user command input unit 604 is given to an image priority or a character priority. When the priority is given to the other setting, at S803 the control unit performs the other processing and the process ends. On the other hand, when the set priority is given to the image priority or the character priority, the control unit goes to the process at S804.

At S804, the control unit determines whether the set priority is given to the image priority or the character priority. When the priority is given to the character priority, at S805 the control unit sets a priority flag (FLG) to the character. On the other hand, when the priority is given to the image priority, at S806 the control unit sets the priority flag (FLG) to the image.

Figure 7B:
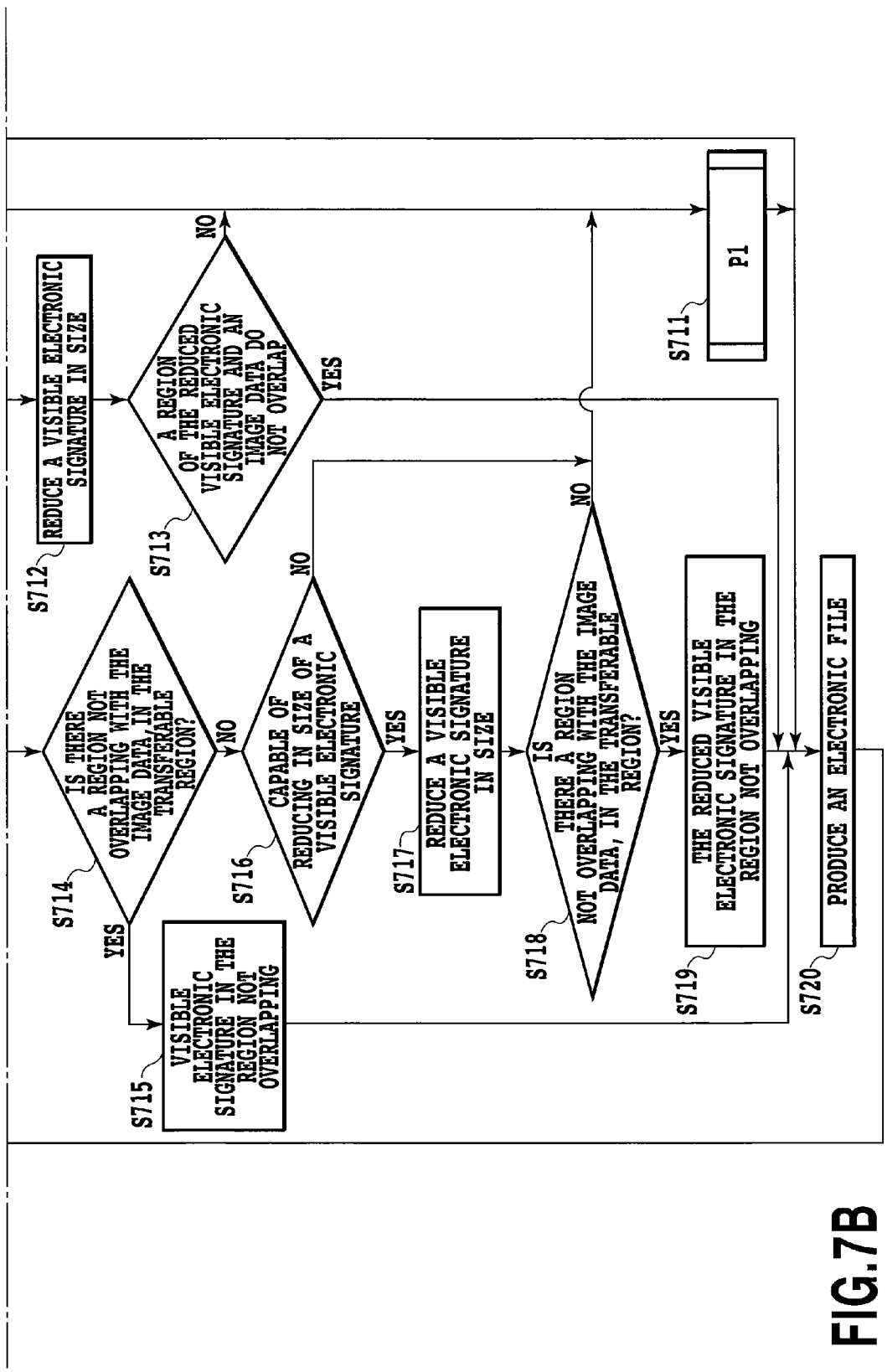
FIG. 7B is a flow chart showing a flow of control in the image processing device according to the second embodiment.

FIG. 7 is a flow chart showing a flow of control in the image processing device according to the second embodiment.

At S702, the control unit waits for an image reading instruction which is input to the control unit from the user command input unit 604.

When the image reading instruction is input, at S703 the control unit determines whether or not the setting of adding a visible electronic signature to an electronic file to be produced is made. Whether to add the visible electronic signature or not is in advance set through the user command input unit 604 by a user. In a case where the setting of adding the visible electronic signature is not made, the control unit goes to the process at S708, wherein usual image reading processing is performed and an electronic file is produced from the image data read from S720. On the other hand, in a case where the setting of adding the visible electronic signature is made, the control unit goes to the process at S704, wherein the image reading processing is performed.

At S705, the control unit generates an image data from the read image.

At S706, the control unit uses the region separating unit 609 to separate the image data produced at S705 into an image region and a character region and extract the separated image data. For the region separation, a known method can be used. In this processing, a character image data of a header/footer of a page number or the like provided by the image processing device or a header/footer provided to the image from the beginning may be deleted from the separated character region.

At S707, the control unit determines whether or not an arrangement region of a visible electronic signature in advance specified by a user and an image data in the character region or in the image region overlap.

In a case where the arrangement region of the visible electronic signature and the image data overlap, the control unit goes to the process at S709, and in a case where the arrangement region of the visible electronic signature and the image data do not overlap, the control unit goes to S708.

At S708 the control unit adds the visible electronic signature to the image data and at S720, the control unit produces an electronic file from the image data to which the visible electronic signature is added, and the process goes back to the process at S702.

At S709, the control unit determines whether or not a transfer of the visible electronic signature is permitted within a range of a preset region. The transfer region of the visible electronic signature and the permission/non-permission on the transfer within the range of the region are in advance set at the user command input unit 604 by a user.

In a case where the transfer of the visible electronic signature is not permitted, at S710 the control unit determines YES/NO of a reduction in size of the visible electronic signature. YES/NO of the reduction in size of the visible electronic signature is in advance set at the user command input unit 604 by a user.

In a case where the reduction in size of the visible electronic signature can not be made, at S711 the control unit performs the processing of PI (processing specific in the present invention and a detail thereof will be described later) produces an electronic file at S720, and goes back to the process at S702.

In a case where the reduction in size of the visible electronic signature can be made, at S712 the control unit reduces the size of the visible electronic signature. Next, At S713, the control unit determines whether or not an arrangement region of the reduced visible electronic signature and an image data in the character region or in the image region overlap.

In a case where the arrangement region of the reduced visible electronic signature and the image data do not overlap, the control unit provides the reduced visible electronic signature to the image data and at S720, the control unit produces an electronic file from the image data to which the visible electronic signature is added (S720), and the process goes back to the process at S702.

In a case where the arrangement region of the reduced visible electronic signature and the image data overlap, the control unit performs the aforementioned processing of the PI at S711, at S720 the control unit produces an electronic file, and the process goes back to the process at S702.

On the other hand, in a case where at S709 it is determined that the transfer of the visible electronic signature can be made, at S714 the control unit determines whether or not there exists a region which is equal to or larger than the region of the visible electronic signature and in which the image data of the character region or the image region does not exist, within a range of a preset region. That is, the control unit determines whether or not a region which does not overlap with the image data exists in a transfer possible region of the visible electronic signature.

In a case where the region which does not overlap with the image data exists in the transfer possible region of the visible electronic signature, at S715 the control unit adds the visible electronic signature to the region, and at S720, the control unit produces an electronic file from the image data to which the visible electronic signature is added, and the process goes back to the process at S702.

In a case where the region which does not overlap with the image data does not exist in the transfer possible region of the visible electronic signature, at S716 the control unit determines whether or not the visible electronic signature can be reduced in size. In a case where the reduction in size of the visible electronic signature can not be made, at S711 the control unit performs the aforementioned processing of the PI, produces an electronic file at S720, and goes back to the process at S702.

In a case where the reduction in size of the visible electronic signature can be made, at S717 the control unit reduces the size of the visible electronic signature. Next, at S718 the control unit determines whether or not there exists a region in which an image data of the character region or the image region equal to or larger than the region of the reduced visible electronic signature does not exist, within a range of a preset region. That is, the control unit determines whether or not a region which does not overlap with the image data exists in the transfer possible region of the visible electronic signature.

In a case where the region which does not overlap with the image data does not exist in the transfer possible region of the visible electronic signature, at S711 the control unit performs the aforementioned processing of the PT, produces an electronic file at S720, and goes back to the process at S702.

In a case where the region which does not overlap with the image data exists in the transfer possible region of the visible electronic signature, at S719 the control unit adds the reduced visible electronic signature to the region and at S720, the control unit produces an electronic file from the image data to which the reduced visible electronic signature is added, and the process goes back to the process at S702.

Figure 9:
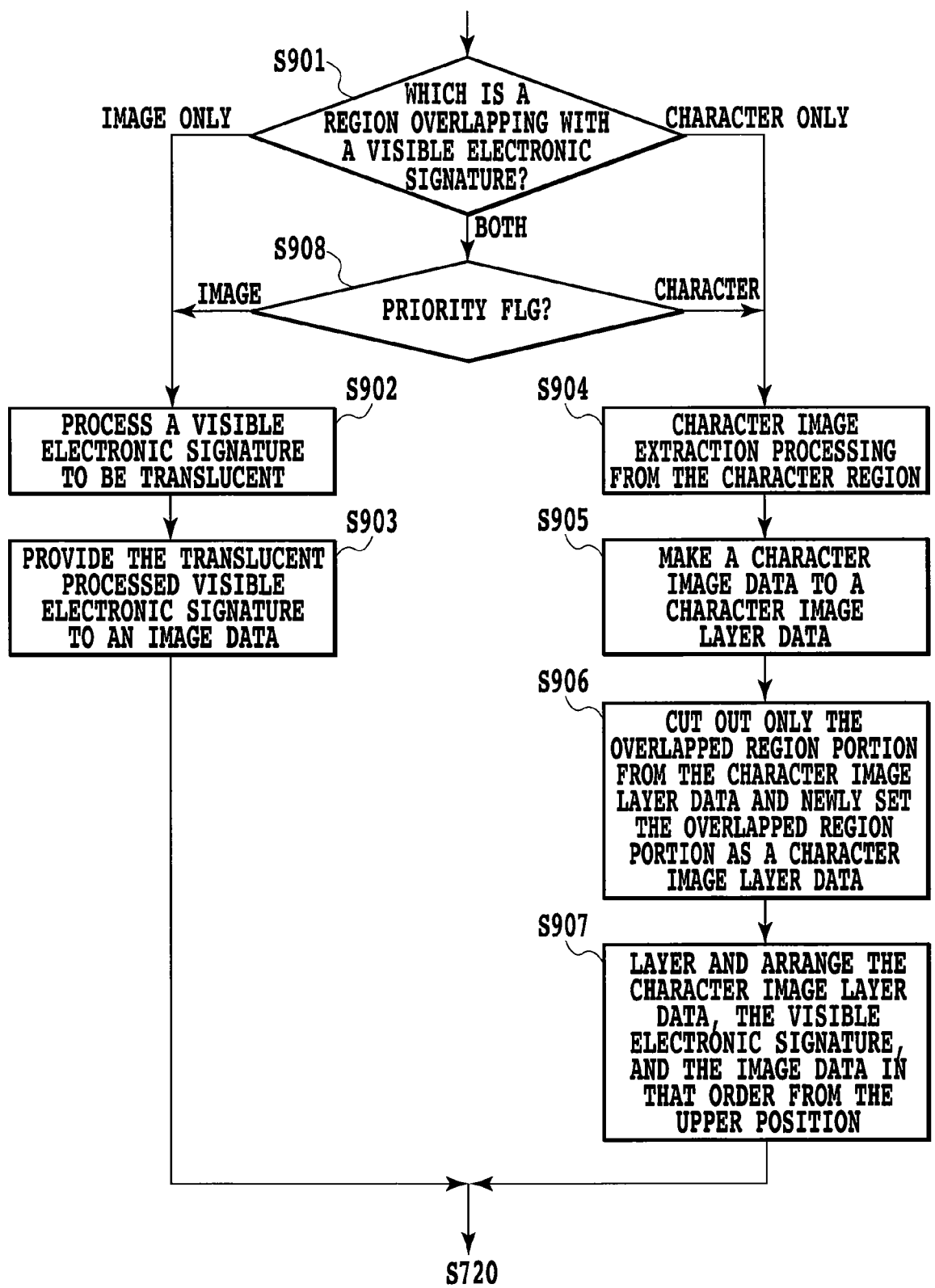
FIG. 9 is a flow chart showing a flow of the processing at S711 shown in FIG. 7.

Next, by referring to FIG. 9, a detail of the aforementioned processing of the PI (S711 in FIG. 7) will be explained.

At S901, the control unit determines whether the region overlapping with the region of the visible electronic signature is the character region, the image region or both of them. As a result, in a case where the overlapped region is only the image region, the control unit goes to the process at S902, in a case where the overlapped region is only the character region, the control unit goes to the process at S904, and in a case where the overlapped region is both of them, the control unit goes to the process at S908.

In a case where the region overlapping with the region of the visible electronic signature is only the image region, at S902 the control unit processes the visible electronic signature to be translucent by using the translucent-processed processing unit 607. The image processing for the translucent-processed can use a known method.

At S903, the control unit adds the translucent processed visible electronic signature to the image data and goes to the process at S720 (FIG. 7).

Figure 10:
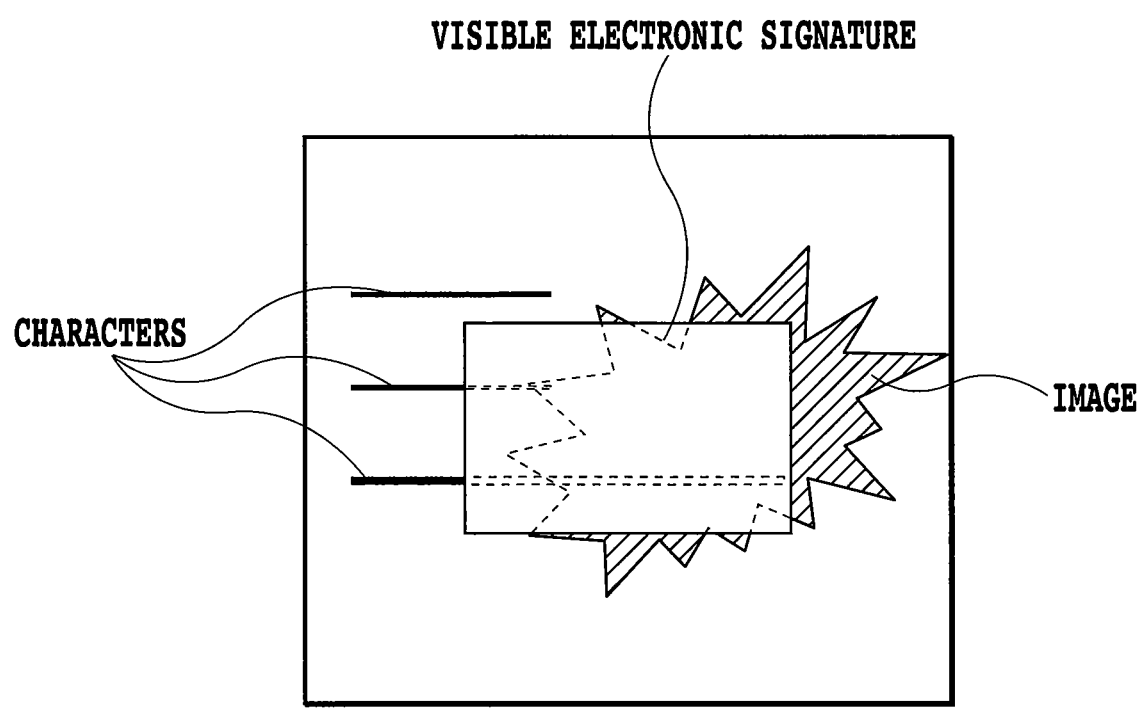
FIG. 10 is a diagram showing a screen example at the time of viewing an electronic file produced by adding a translucent processed visible electronic signature to an image data, with a viewer application.

FIG. 10 is a diagram showing a screen example at the time of viewing an electronic file produced by adding the translucent processed visible electronic signature to the image data, with a viewer application.

On the other hand, in a case where the region overlapping with the region of the visible electronic signature is only the character region, at S904 the control unit performs the character image extraction processing to the character region overlapping with the region of the visible electronic signature by using the character image extraction processing unit 606. The character image extraction processing can use a known method. The character image data outputted from the character image extraction processing unit 606 by the process at S904 is made as a bit map data. In the present embodiment, the character image data to be outputted is made as the bit map data, but it is not limited thereto. The character image data may be a vector data expressing a contour of the character with a vector.

At S905, the control unit uses the character Image data outputted from the character image extraction processing unit 606 to produce a character image layer data in which only the character image data is described on a transparent background. At this time, a character image data of a header/footer of a page number or the like provided by the image processing device or a header/footer provided to the image from the beginning may be deleted from the character image layer data to be produced.

At S906, the control unit cuts out the character contained in the region overlapping with the arrangement region of the visible electronic signature from the character image layer data and newly sets the cut-out character as a character image layer data.

At S907, the control unit produces an electronic file with a layered structure having the character image layer data, the visible electronic signature and the image data in that order from the upper position of the layered structure, and the control unit goes to the process at S720.

FIG. 4 is a diagram showing the layered structure obtained by the process at S907. The layered structure is constructed of the character image layer, the visible electronic signature layer and the image layer. FIG. 5 is a diagram showing a screen example at the time of viewing the electronic file produced by the process at S907 with a viewer application.

When the region overlapping with the region of the visible electronic signature is both of the character region and the image region, at S908 the control unit refers to a preset priority flag (FLG). When the priority flag is an image, the control unit goes to the process at S902, and when the priority flag is a character, the control unit goes to the process at S904.

Figure 11:
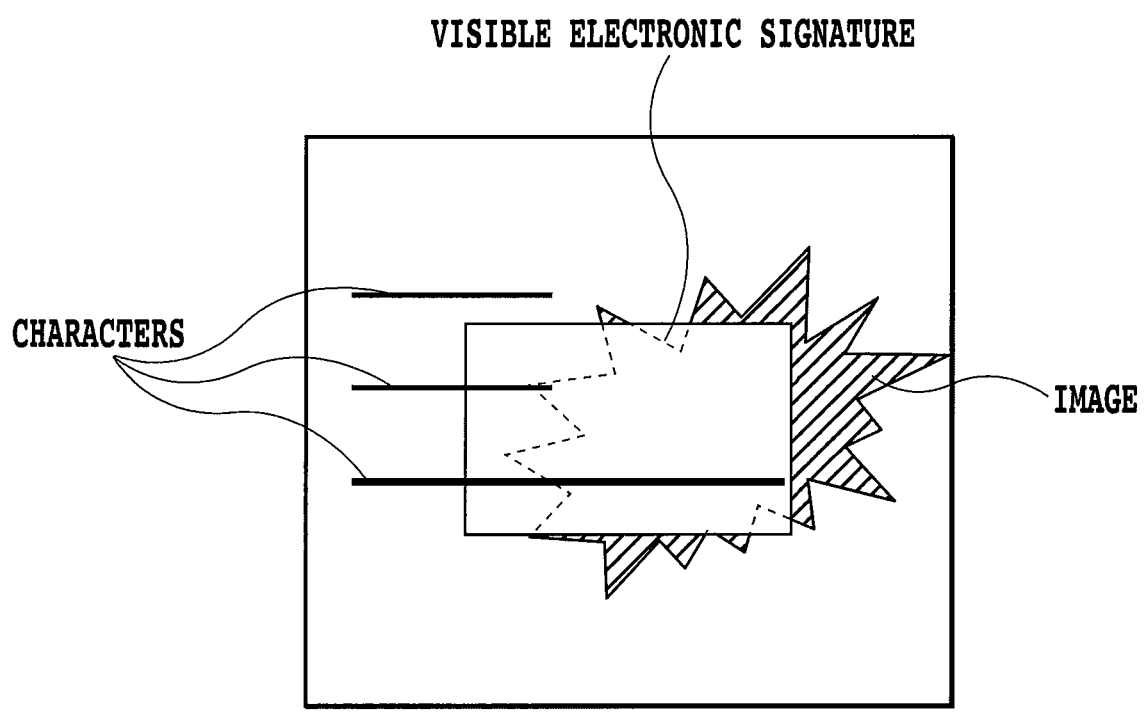
FIG. 11 is a diagram showing a screen example at the time of viewing an electronic file with a viewer application.

The second embodiment is a control method of separately performing the processing in a case of the character priority and the processing in a case of the image priority, but the processing in a case of the character priority and the processing in a case of the image priority may be performed simultaneously. FIG. 11 is, in this case, a diagram showing a screen example at the time of viewing an electronic file to be produced with a viewer application. As seen from FIG. 11, this example processes the visible electronic signature to be translucent and also produces an electronic file with a layered structure having the character image layer data, the visible electronic signature, and the image data in that order from the upper position of the layered structure.

Other Embodiment

The present invention may adopt an embodiment of a system, a device, a method, a computer program, or a computer readable print medium. The present invention may be applied to a system constructed of a plurality of units or a single device.

An embodiment in the present invention includes supplying a computer program realizing the aforementioned function in the present invention through a print medium or a network to a system or a device for performing the computer program by a computer equipped in the system or in the device. The print medium is a computer readable print medium. Therefore, the embodiment includes the computer program itself for realizing the function in the present invention. The computer program includes an object code, a program performed by an inter printer, a script data supplied to an OS, and the like. The print medium includes a floppy (trade mark) disc, a hard disc, an optical disc, an optical magnetic disc, a MO, a CD-ROM, a CD-R, a CD-RW, a magnetic tape, an involatile memory card, a ROM, a DVD and the like. A supply method of the program includes, for example, a method of downloading the program from the Internet to a print medium such as a hard disc using a browser of a client computer. This method downloads a file of the computer program or a file which is compressed and includes an automatic installation function from the Internet. The embodiment includes dividing the program code constituting the computer program into a plurality of files and downloading each file from different servers. The embodiment includes a server for downloading the file of the computer program by a plurality of users.

The function in the aforementioned embodiment can be realized by performing the computer program by the computer. The function in the aforementioned embodiment can be realized by performing all or a part of the actual processing with an OS working on a computer based upon an instruction of the computer program.

Even after the computer program read from the print medium is written in a memory equipped with a function expansion board inserted into the computer or a function expansion unit connected to the computer, the function of the aforementioned embodiment can be realized. That is, the function of the aforementioned embodiment can be realized also by performing all or a part of the actual processing with a CPU equipped in the function expansion board or the function expansion unit based upon an instruction of the computer program.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-181413 filed Jul. 11, 2008 which is hereby incorporated by reference herein in its entirety.

What is claimed is:

1. An image processing apparatus which adds a visible electronic signature to image data, comprising at least one central processing unit which executes a program, wherein the at least one central processing unit functions as:
   a character image extraction unit that extracts character image data except a header and/or footer from the image data;
   a determination unit that determines whether or not a region where the visible electronic signature is to be arranged and a region of the extracted character image data overlap with each other;
   a character image layer generating unit that generates a character image layer data in which the extracted character image data is described on a transparent background, in a case where said determination unit determines that the region where the visible electronic signature is to be arranged and the region of the extracted character image data overlap with each other, wherein the character image data is visible; and
   a file generating unit that generates an electronic file with a layered structure having the character image layer data, the visible electronic signature and the image data in that order from an upper position of the layered structure, in a case where said determination unit determines that the region where the visible electronic signature is to be arranged and the region of the character image data overlap with each other.

2. An image processing apparatus according to claim 1, wherein:
   said character image extraction unit obtains the extracted character image data by deleting character image data of a header and/or footer from all character image data included in an image data.

3. An image processing apparatus according to claim 1, wherein:
   said file generating unit generates an electronic file of the image data to which the visible electronic signature is added, in a case where said determination unit determines that the region where the visible electronic signature is to be arranged and the region of the character image data do not overlap with each other.

4. An image processing apparatus according to claim 1, wherein:
   the extracted character image data includes bit map data or vector data.

5. An image processing apparatus which adds a visible electronic signature to image data, comprising at least one central processing unit which executes a program, wherein the at least one central processing unit functions as:

a character image extraction unit that extracts character image data from the image data;

a determination unit that determines whether or not a region where the visible electronic signature is to be arranged and a region of the extracted character image data overlap with each other;

a character image layer generating unit that generates character image layer data in which only the character image data overlapped on the region where the visible electronic signature is to be arranged is described in a case where said determination unit determines that the region where the visible electronic signature is to be arranged and the region of the character image data overlap with each other; and a file generating unit that generates an electronic file with a layered structure having the character image layer data, the visible electronic signature and the image data in that order from an upper position of the layered structure in a case where said determination unit determines that the region where the visible electronic signature is to be arranged and the region of the character image data overlap with each other.

6. An image processing apparatus which adds a visible electronic signature to image data, comprising at least one central processing unit which executes a program, wherein the at least one central processing unit functions as:

a region separating unit that extracts a character region except a header and/or footer and an image region from the image data;

a selection unit that selects at least one of translucency processing of the visible electronic signature and generation of character image layer data in which the character image data of the extracted character region is described on a transparent background according to a preset priority in a case where both of the image region and the extracted character region overlap with the region where the visible electronic signature is to be arranged;

a translucence unit that processes the visible electronic signature to be translucent in a case where said selection unit selects translucency processing of the visible electronic signature;

a character image layer generating unit that generates character image layer data in which the character image data is described on a transparent background in a case where said selection unit selects generation of character image layer data, wherein the character image data is visible; and a file generation unit that generates an electronic file having the image data to which the translucent processed visible electronic signature is added in a case where said selection unit selects the translucency processing of the visible electronic signature and otherwise generates an electronic file with a layered structure having the character image layer data, the visible electronic signature, and the image data, in that order from the upper position of the layered structure, in a case where said selection unit selects the generation of the character image layer data.

7. An image processing apparatus according to claim 6, wherein:

said region separating unit obtains the extracted character image data by deleting character image data of the header and/or a footer from all character image data included in the image data.

8. An image processing apparatus according to claim 6, wherein:

the priority is set in advance by a user.

9. An image processing apparatus according to claim 6, further comprising:

a first determination unit that determines whether or not the region where the visible electronic signature is to be arranged and at least one of the extracted character region and the extracted image region overlap with each other; and a second determination unit that determines whether or not the visible electronic signature can be processed not to be overlapped with any of the extracted character region or the extracted image region by performing at least one of reducing or transferring the visible electronic signature in a case where overlapping is determined by said first determination unit, wherein a file generation unit generates an electronic file having the image data to which the either reduced or transferred visible electronic signature is added, in a case where said second determination unit determines that the visible electronic signature can either be reduced or transferred.

10. An image processing apparatus according to claim 9, further comprising:

a third determination unit that determines whether the region where the visible electronic signature is to be arranged overlaps with the extracted character region, the extracted image region or both of the extracted character region and the extracted image region, in a case where said second determination unit determines that the visible electronic signature cannot be processed not to be overlapped with any of the extracted character region or the extracted image region, wherein said selection unit selects at least one of translucency processing of the visible electronic signature and generation of character image layer data in which the character image data of the character region is described on a transparent background according to a preset priority in a case where said third determination unit determines that both of the image region and the character region overlap with the region where the visible electronic signature is to be arranged.

11. An image processing apparatus which adds a visible electronic signature to image data, comprising at least one central processing unit which executes a program, wherein the at least one central processing unit functions as:

a region separating unit that extracts a character region and an image region from the image data;

a first determination unit that determines whether or not the region where the visible electronic signature is to be arranged and at least one of the extracted character region and the image region overlap with each other; and a second determination unit that determines whether or not the visible electronic signature can be processed not to be overlapped with any of the extracted character region or the extracted image region by performing at least one of reducing or transferring the visible electronic signature in a case where overlapping is determined by said first determination unit, wherein a third determination unit that determines whether the region where the visible electronic signature is to be arranged overlaps with the extracted character region, the extracted image region or both of the extracted character region and the extracted image region in a case where said second determination unit determines that the visible electronic signature cannot be processed not to be overlapped with any of the extracted character region or the extracted image region, wherein
a selection unit that selects at least one of translucency processing of the visible electronic signature and generation of character image layer data in which the character image data of the extracted character region is described on a transparent background according to a preset priority in a case where both of the image region and the extracted character region overlap with the region where the visible electronic signature is to be arranged;
a translucence unit that processes the visible electronic signature to be translucent in a case where said selection unit selects translucency processing of the visible electronic signature;
a character image layer generating unit that generates a character image layer data in which the character image data is described on a transparent background in a case where said selection unit selects generation of character image layer data;
a file generation unit that generates an electronic file having the image data to which the translucent processed visible electronic signature is added, in a case where said third determination unit determines that the region where the visible electronic signature is to be arranged overlaps with the extracted image region or in a case said selection unit selects the translucency processing of the visible electronic signature, and that generates an electronic file with a layered structure having the character image layer data, the visible electronic signature, and the image data, in that order from the upper position of the layered structure, in a case where said third determination unit determines that the region where the visible electronic signature is to be arranged overlaps with the extracted character region or in a case where said selection unit selects the generation of the character image layer data, and that generates an electronic file having the image data to which the either reduced or transferred visible electronic signature is added in a case where said second determination unit determines that the visible electronic signature can either be reduced or transferred.

12. An image processing method which adds a visible electronic signature to image data, comprising:
a character image extraction step of extracting character image data except a header and/or footer from the image data;
a determination step of determining whether or not a region where the visible electronic signature is to be arranged and a region of the extracted character image data overlap with each other;
a character image layer generating step of generating character image layer data in which the extracted character image data is described on a transparent background, in a case where said determination step determines that the region where the visible electronic signature is to be arranged and the region of the extracted character image data overlap with each other, wherein the character image data is visible; and
a file generating step of generating an electronic file with a layered structure having the character image layer data, the visible electronic signature and the image data, in that order from an upper position of the layered structure in a case where said determination unit determines that the region where the visible electronic signature is to be arranged and the region of the character image data overlap with each other.

13. An image processing method which adds a visible electronic signature to image data, comprising:
a region separating step of extracting a character region except a header and/or footer and an image region from the image data;
a selection step of selecting at least one of translucency processing of the visible electronic signature and generation of character image layer data in which the extracted character image data of the character region is described on a transparent background according to a preset priority, in a case where both of the image region and the extracted character region overlap with the region where the visible electronic signature is to be arranged;
a translucence step of processing the visible electronic signature to be translucent, in a case where said selection step selects translucency processing of the visible electronic signature;
a character image layer generating step of generating character image layer data in which the character image data is described on a transparent background, in a case where said selection step selects generation of character image layer data, wherein the character image data is visible; and
a file generation step of generating an electronic file having the image data to which the translucent processed visible electronic signature is added, in a case where said selection step selects the translucency processing of the visible electronic signature, and otherwise generating an electronic file with a layered structure having the character image layer data, the visible electronic signature, and the image data, in that order from the upper position of the layered structure, in a case where said selection step selects the generation of the character image layer data.

14. A non-transitory computer readable storage medium storing a program for causing at least one central processing unit to function as
a character image extraction unit that extracts character image data except a header and/or footer from image data;
a determination unit that determines whether or not a region where a visible electronic signature is to be arranged and a region of the extracted character image data overlap with each other;
a character image layer generating unit that generates a character image layer data in which the extracted character image data is described on a transparent background, in a case where said determination unit determines that the region where the visible electronic signature is to be arranged and the region of the extracted character image data overlap with each other, wherein the character image data is visible; and
a file generating unit that generates an electronic file with a layered structure having the character image layer data, the visible electronic signature and the image data in that order from an upper position of the layered structure, in a case where said determination unit determines that the region where the visible electronic signature is to be arranged and the region of the character image data overlap with each other.

15. A non-transitory computer readable storage medium storing a program for causing at least one central processing unit to function as
a character image extraction unit that extracts character image data from image data;

a determination unit that determines whether or not a region where a visible electronic signature is to be arranged and a region of the extracted character image data overlap with each other;

a character image layer generating unit that generates character image layer data in which only the character image data overlapped on the region where the visible electronic signature is to be arranged is described, in a case where said determination unit determines that the region where the visible electronic signature is to be arranged and the region of the character image data overlap with each other; and a file generating unit that generates an electronic file with a layered structure having the character image layer data, the visible electronic signature and the image data in that order from an upper position of the layered structure, in a case where said determination unit determines that the region where the visible electronic signature is to be arranged and the region of the character image data overlap with each other.

16. A non-transitory computer readable storage medium storing a program for causing at least one central processing unit to function as a region separating unit that extracts a character region except a header and/or footer and an image region from image data;

a selection unit that selects at least one of translucency processing of a visible electronic signature and generation of character image layer data in which the character image data of the extracted character region is described on a transparent background according to a preset priority, in a case where both of the image region and the extracted character region overlap with the region where the visible electronic signature is to be arranged;

a translucence unit that processes the visible electronic signature to be translucent in a case where said selection unit selects translucency processing of the visible electronic signature;

a character image layer generating unit that generates character image layer data in which the character image data is described on a transparent background, in a case where said selection unit selects generation of character image layer data, wherein the character image data is visible; and a file generation unit that generates an electronic file having the image data to which the translucent processed visible electronic signature is added, in a case where said selection unit selects the translucency processing of the visible electronic signature and otherwise generates an electronic file with a layered structure having the character image layer data, the visible electronic signature, and the image data, in that order from the upper position of the layered structure, in a case where said selection unit selects the generation of the character image layer data.

17. A non-transitory computer readable storing medium storing a program for causing at least one central processing unit to function as a region separating unit that extracts a character region and an image region from image data;

a first determination unit that determines whether or not a region where a visible electronic signature is to be arranged and at least one of the extracted character region and the image region overlap with each other;

a second determination unit that determines whether or not the visible electronic signature can be processed not to be overlapped with any of the extracted character region or the extracted image region by performing at least one of reducing or transferring the visible electronic signature in a case where overlapping is determined by said first determination unit;

a third determination unit that determines whether the region where the visible electronic signature is to be arranged overlaps with the extracted character region, the extracted image region or both of the extracted character region and the extracted image region in a case where said second determination unit determines that the visible electronic signature cannot be processed not to be overlapped with any of the extracted character region or the extracted image region;

a selection unit that selects at least one of translucency processing of the visible electronic signature and generation of character image layer data in which the character image data of the extracted character region is described on a transparent background according to a preset priority in a case where both of the image region and the extracted character region overlap with the region where the visible electronic signature is to be arranged;

a translucence unit that processes the visible electronic signature to be translucent in a case where said selection unit selects translucency processing of the visible electronic signature;

a character image layer generating unit that generates a character image layer data in which the character image data is described on a transparent background in a case where said selection unit selects generation of character image layer data; and a file generation unit that generates an electronic file having the image data to which the translucent processed visible electronic signature is added, in a case where said third determination unit determines that the region where the visible electronic signature is to be arranged overlaps with the extracted image region or in a case said selection unit selects the translucency processing of the visible electronic signature, and that generates an electronic file with a layered structure having the character image layer data, the visible electronic signature, and the image data, in that order from the upper position of the layered structure, in a case where said third determination unit determines that the region where the visible electronic signature is to be arranged overlaps with the extracted character region or in a case where said selection unit selects the generation of the character image layer data, and that generates an electronic file having the image data to which the either reduced or transferred visible electronic signature is added in a case where said second determination unit determines that the visible electronic signature can either be reduced or transferred.

* * * * *